United States Patent
> Mason

[15] 3,702,498
[45] Nov. 14, 1972

[54] APPARATUS AND METHOD FOR PROVIDING INSULATION IN THE SLOTS OF MAGNETIC CORES

[72] Inventor: Lowell M. Mason, Fort Wayne, Ind.
[73] Assignee: General Electric Company
[22] Filed: May 18, 1971
[21] Appl. No.: 144,426

[52] U.S. Cl. ...................29/596, 29/205 E, 93/1 R, 93/1 G
[51] Int. Cl. ...H02k 15/00, H02k 15/14, H02k 15/16
[58] Field of Search....29/596, 205 E, 205 R; 93/1 R, 93/1 G, 1 WZ; 310/214, 215

[56] References Cited

UNITED STATES PATENTS

| | | | |
|---|---|---|---|
| 3,616,512 | 11/1971 | Appenzeller | 29/205 E |
| 3,514,836 | 6/1970 | Mason | 29/205 E |
| 1,827,740 | 10/1931 | Eaton | 29/205 E |
| 2,473,332 | 6/1949 | England | 310/215 X |
| 2,808,640 | 10/1957 | Biddison | 29/205 E |
| 2,958,122 | 11/1960 | Turk | 29/205 E |
| 2,967,346 | 1/1961 | McMaster et al. | 29/596 |
| 3,150,280 | 9/1964 | Little | 310/215 |
| 3,210,583 | 10/1965 | Profitt et al. | 310/215 |
| 3,254,394 | 6/1966 | Roberts | 29/596 |

Primary Examiner—John F. Campbell
Assistant Examiner—Carl E. Hall
Attorney—John M. Stoudt, Ralph E. Krisher, Jr., Radford M. Reams, Frank L. Neuhauser and Oscar B. Waddell

[57] ABSTRACT

Apparatus and method for producing formed pieces of insulation and for placing formed pieces of insulation into nonradially aligned or otherwise irregularly oriented slots of a magnetic core. Dielectric strip material is fed to a sizing and forming station by a strip accumulating and urging device, and dielectric material pieces of preselected sizes are formed. The pieces are formed on a preselected forming device as a core is aligned relative to the forming member so that the insulation pieces may be inserted into a core slot which the insulation piece has been particularly formed to fit. Preferred form of apparatus includes compensating means for selectively positioning a core support relative to a datum plane of the apparatus. This means, in one form, includes a first drive member that tends to drive a driven member through a fixed angular increment. The driven member is movable about a preselected movable reference point which in turn is movable differential amounts relative to the pitch of drive line of the first drive member so that the driven member is selectively movable through a preselected net differential increment of travel relative to a fixed increment of travel of the first drive member.

15 Claims, 18 Drawing Figures

INVENTOR:
Lowell M. Mason,
BY Ralph E. Krisher Jr.
ATTORNEY.

INVENTOR:
Lowell M. Mason,
BY Ralph E. Krisher Jr.
ATTORNEY.

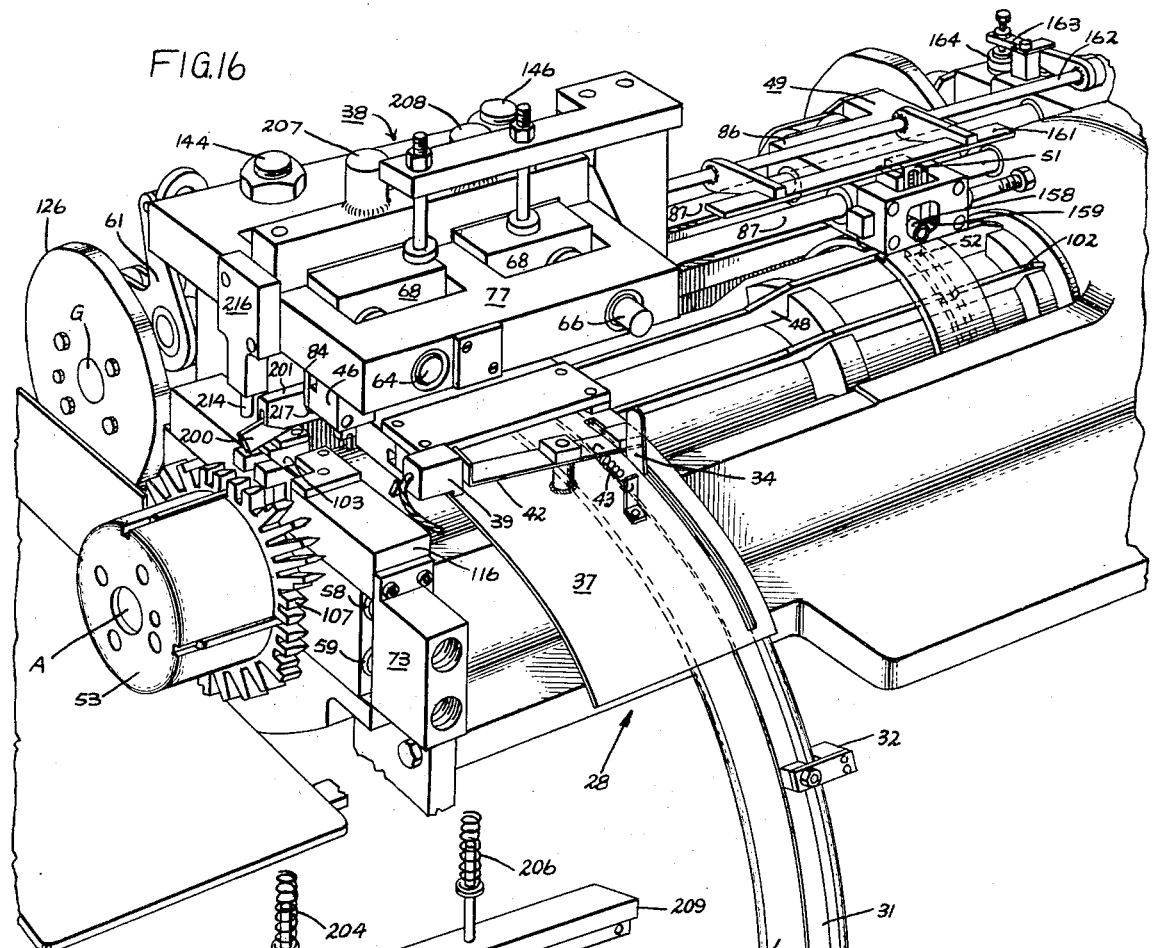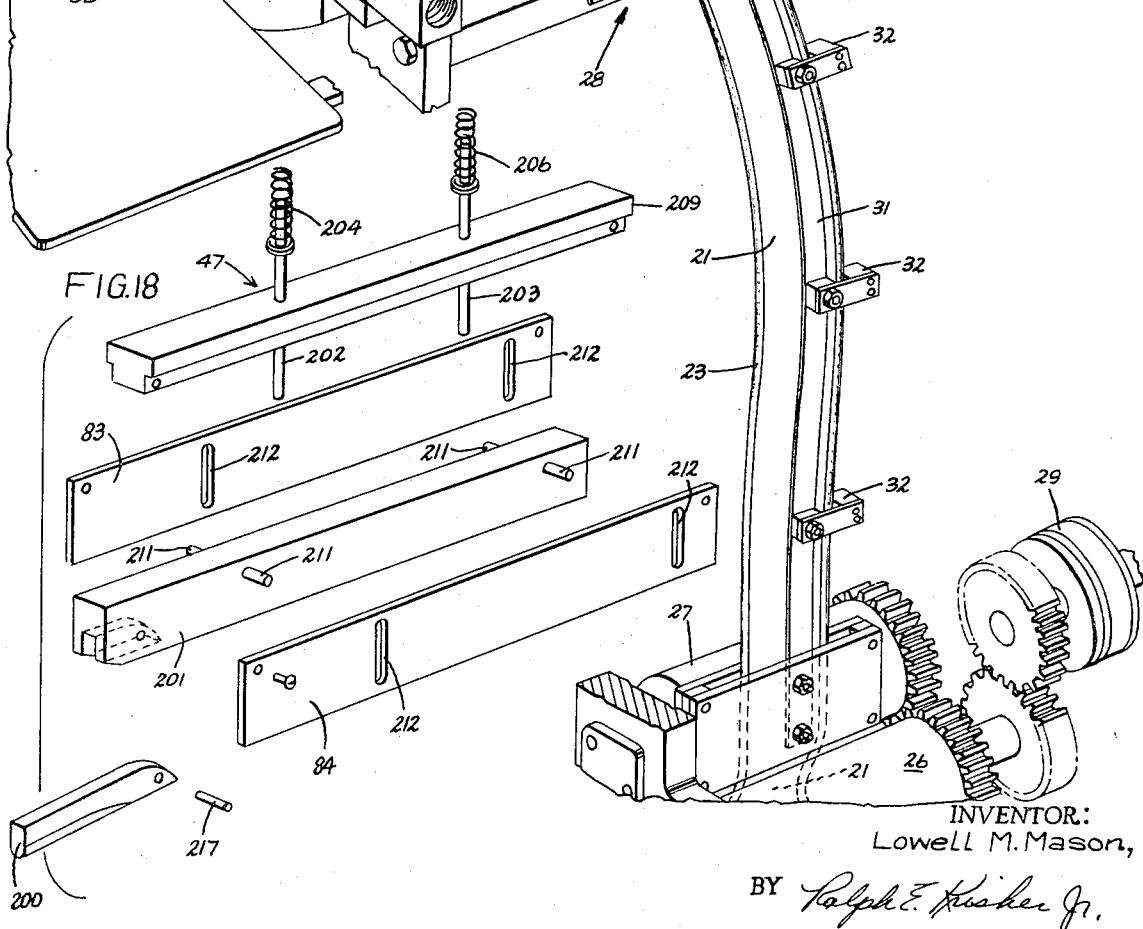

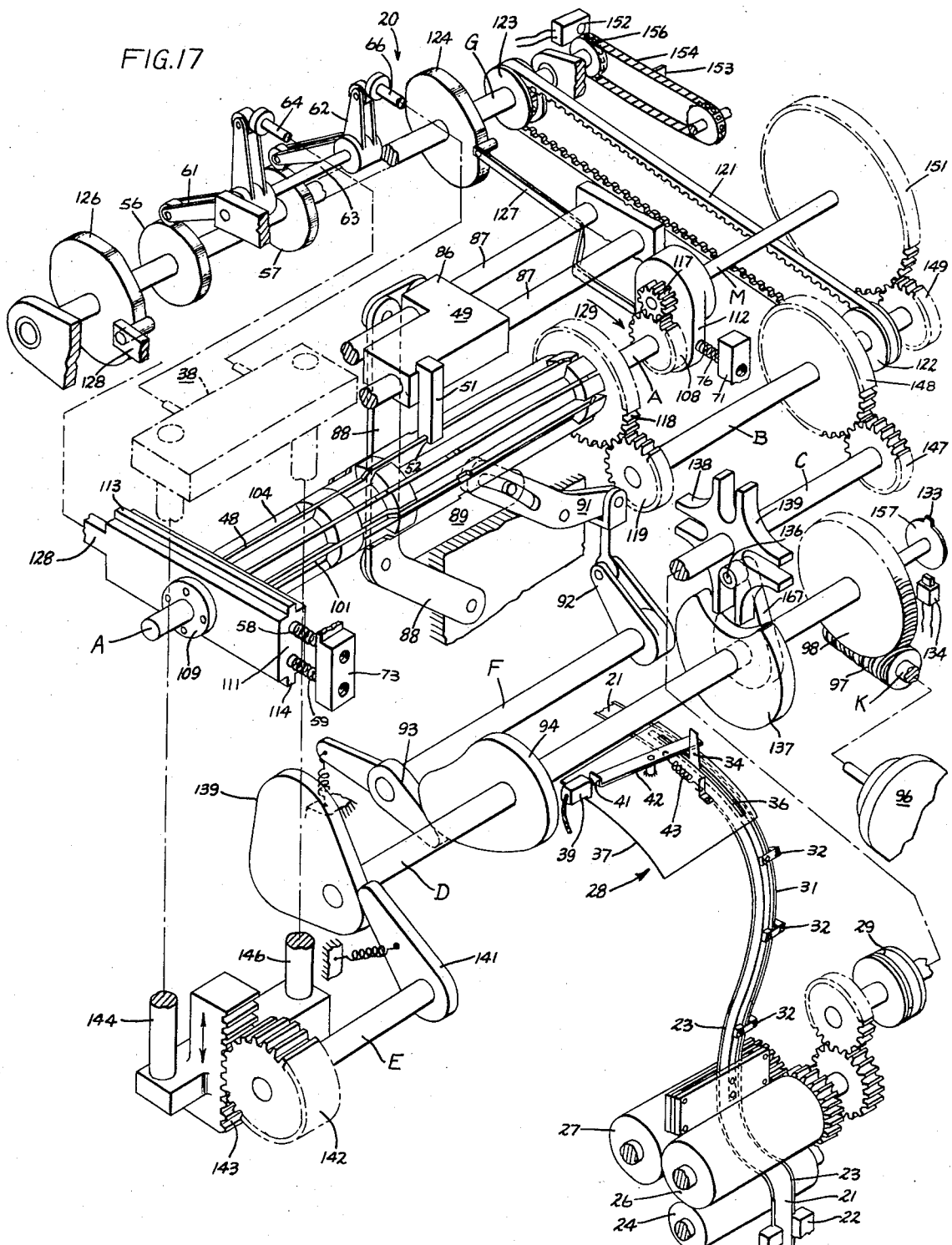

APPARATUS AND METHOD FOR PROVIDING INSULATION IN THE SLOTS OF MAGNETIC CORES

CROSS REFERENCE TO RELATED APPLICATIONS

A related application is co-pending Lowell M. Mason application Ser. No. 845,996, filed July 30, 1969, now U.S. Pat. No. 3,634,932 a division of an application filed July 17, 1967 which issued June 2, 1970 as U.S. Pat. No. 3,514,836. Both the related application and patent are assigned to the assignee of the present application.

BACKGROUND OF THE INVENTION

The present invention relates to apparatus and methods for producing pieces of electrical insulation and for placing insulation in slots of a magnetic core. More particularly, the present invention relates to an improved method and apparatus wherein insulators, such as slot liners, are formed to fit one or more selected core slots which are nonradially disposed or otherwise irregularly oriented relative to the center of the core.

Many problems associated with forming and placing insulators, such as slot liners, in the slots of magnetic cores and the like, are recognized and set forth in detail in said related and co-pending application, and the entire disclosure of such application is incorporated herein by reference. Other problems remain to be resolved in connection with providing slot liners for the slots of a core wherein one or more of the slots are nonradially disposed. To better understand what is meant by nonradial, it is first noted that radial core slots are generally configured relative to a central core axis so that a radial line extending from such axis would pass approximately through the center of the slot opening and the center of the closed end of the aligned slot. In many cases, the slots will also be symmetrical about such radial line.

In other slot configuration arrangements, and particularly in the case of what have become known as graded slot cores, at least some of the slots are irregularly oriented relative to a central core axis. For example, they may be so asymmetrical about a line passing through the center of the slot opening and the approximate center of the closed wall of the same slot that slot liners may be placed therein only with extreme difficulty. In still other configurations, even when a slot is symmetrical about a line passing through the center of the slot opening and closed wall of the same slot, such line will be nonradial relative to the core center. Accordingly, nonradially disposed slots are meant to include slots that are not generally aligned with and/or are not generally symmetrical with respect to a radial line passing through the center of the core, and to also include slots that are irregularly oriented so that simple rotation of a core about a fixed axis of rotation will not bring such slots into general alignment with a radial line passing through such axis.

One technique that has been used heretofore for providing slot insulation for nonradial slotted cores has included the integral insulation approach as taught, for example, in Bender et al U.S. Pat. No. 3,355,309, having an issue date of Nov. 28, 1967 and assigned to the assignee of the present application. Experience has shown, however, that this approach may be quite expensive in practice due to, among other things, the relative cost of integral insulation materials as compared to other available materials such as the well-known paper or polyester film strip insulation materials. On the other hand, placement of the more economical strip materials in nonradial slots has heretofore been very expensive from a labor standpoint. It will thus be understood that it would be desirable to provide new and improved apparatus and methods whereby strip insulation material may be economically placed in cores having nonradial slots.

It is also desirable, when operating on workpieces, e.g., such as stator or rotor cores, that are particularly susceptible to being indexed or rotated through fixed increments of travel about a central axis but are also provided with nonradially disposed slots or other type of nonradially disposed openings, to provide a relatively simple method and means for rotating one or more tools or other machine members about a fixed axis in fixed incremental amounts and for moving the nonradially disposed openings into precise alignment with a tool or machine member.

It would also be desirable to provide apparatus and methods whereby nonradially disposed slots in a slotted core and one or more machine elements may be precisely positioned relative to one another in a selected manner in order to assure consistently satisfactory production quality of slotted cores having material disposed in the slots thereof by such elements.

It is, therefore, an object of the present invention to provide improved apparatus and methods for producing and placing electrical insulators in the slots of magnetic cores.

It is a more specific object of the present invention to provide improved apparatus and methods for providing insulation for nonradial core slots.

It is another object of the present invention to provide improved apparatus and methods for shifting the center of a core relative to an apparatus datum plane whereby strip insulation material may be economically placed in selected slots of such core.

It is yet another object of the present invention to provide improved apparatus and methods for efficiently and precisely positioning nonradial slots of a magnetic core relative to a datum plane of an insulating machine.

SUMMARY OF THE INVENTION

In carrying out the objects of the invention, in one form thereof, I provide an arrangement for performing predetermined manufacturing operations on a workpiece such as an article of manufacture. These may include placing electrical insulators (for example, slot liners) in the slots of a magnetic core, at least some of which slots are nonradially disposed relative to a central core axis.

The illustrated apparatus includes a material feed station for supplying preselected quantities of strip material to a material accumulating and urging station. Located adjacent the accumulating and urging station is an insulating material fabricating means that includes a sizing and forming station wherein preselected lengths of material are advanced, preselected lengths of material are severed, and the severed pieces are formed to generally correspond to a preselected slot in which the strip material is to be disposed.

In the practice of the invention in one form, a slotted core is supported on a workpiece holder means that is shown as a core support and that forms part of a core locating device during operation. The core support is adjacent the sizing and forming station, and alignment or position determining control means are also provided for indexing the stator core radially about a central axis and preselectively shifting the central axis relative to a reference location such as a datum plane of the apparatus. This then results in the precise positioning of successive core slots relative to the datum plane. Preselected ones of a set of inserting tools that preferably are also strip material forming tools, are also successively indexed to preselected positions relative to the reference location. Subsequently, a preselected inserting tool is utilized while placing a formed insulation piece into a core slot aligned with the tool. The position determining control means, in the preferred embodiment, include the locating device and a driven cam.

One form of a preferred method includes angularly indexing a slotted stator core to bring a selected slot opening into approximate registry with a reference location or operating position, e.g., the datum plane, and compensating for the misalignment of nonradially disposed slots relative to the datum plane, forming a preselected length of strip insulating material to interfit with the preselected core slot, and inserting insulation into the preselected core slot. The apparatus and method are extremely versatile in application because cores having a large number of differently shaped slots, including nonradial slots, may be handled. The exemplified apparatus also may be adapted quickly, with a minimum loss of machine operating time, to handle cores having differing slot configurations or diameters.

The subject matter which I regard as my invention is set forth in the appended claims. The invention, itself, however, along with further objects and advantages thereof will be best understood by referring to the accompanying description taken in connection with the drawings.

BRIEF DESCRIPTION OF THE DRAWINGS

FIGS. 2 and 3 illustrate a initial position of a core support shaft and core, respectively;

FIGS. 4, 5, and 6 illustrated intermediate positions of the structure shown in FIGS. 2 and 3;

FIGS. 7 and 8 illustrate the final positions of the FIG. 2 and FIG. 3 structures;

FIG. 16 is an enlarged perspective view of a portion of the apparatus shown in FIG. 14;

FIG. 17 is a schematic perspective view of a portion of the apparatus shown in FIG. 14; and FIG. 18 is an exploded perspective view, somewhat enlarged, of parts of the apparatus shown in FIG. 16.

DESCRIPTION OF THE PREFERRED EMBODIMENTS

Turning now to a consideration of the drawings in more detail, FIGS. 17 and 1 through 14 inclusive are helpful in initially discussing a preferred form of apparatus and method.

Figure 1:
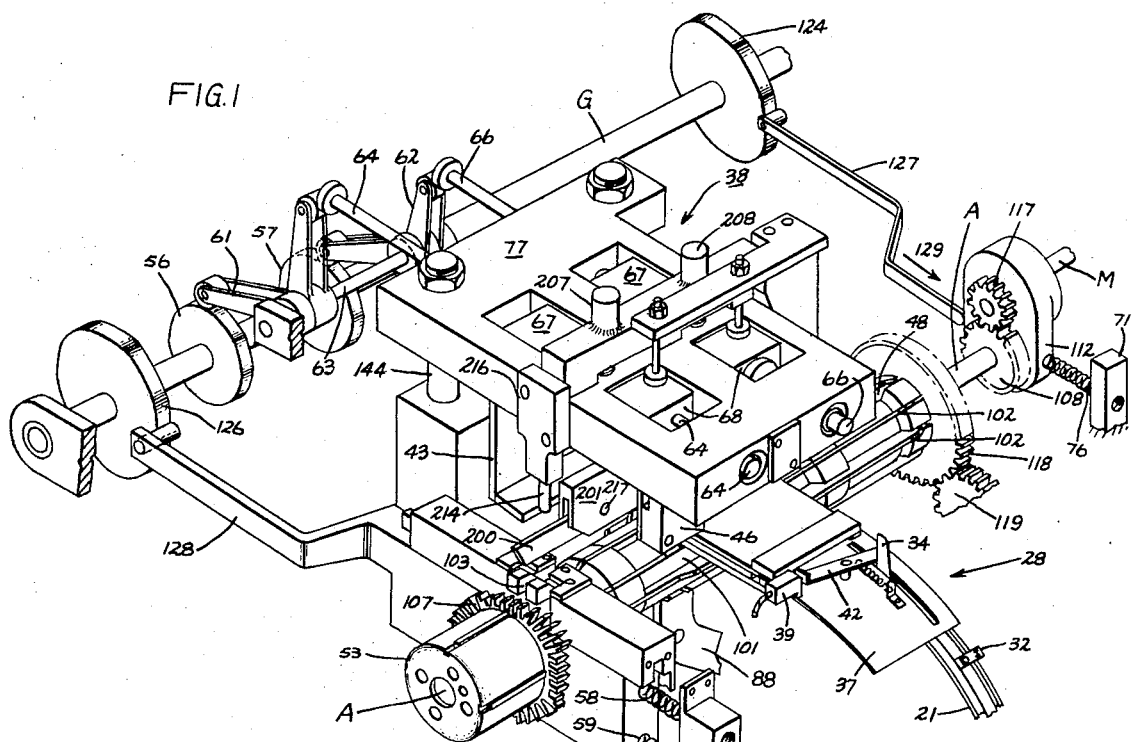
FIG. 1 is an exploded schematic perspective view, with parts removed, of a portion of an apparatus embodying and adapted to practice the present invention.
Figure 14:
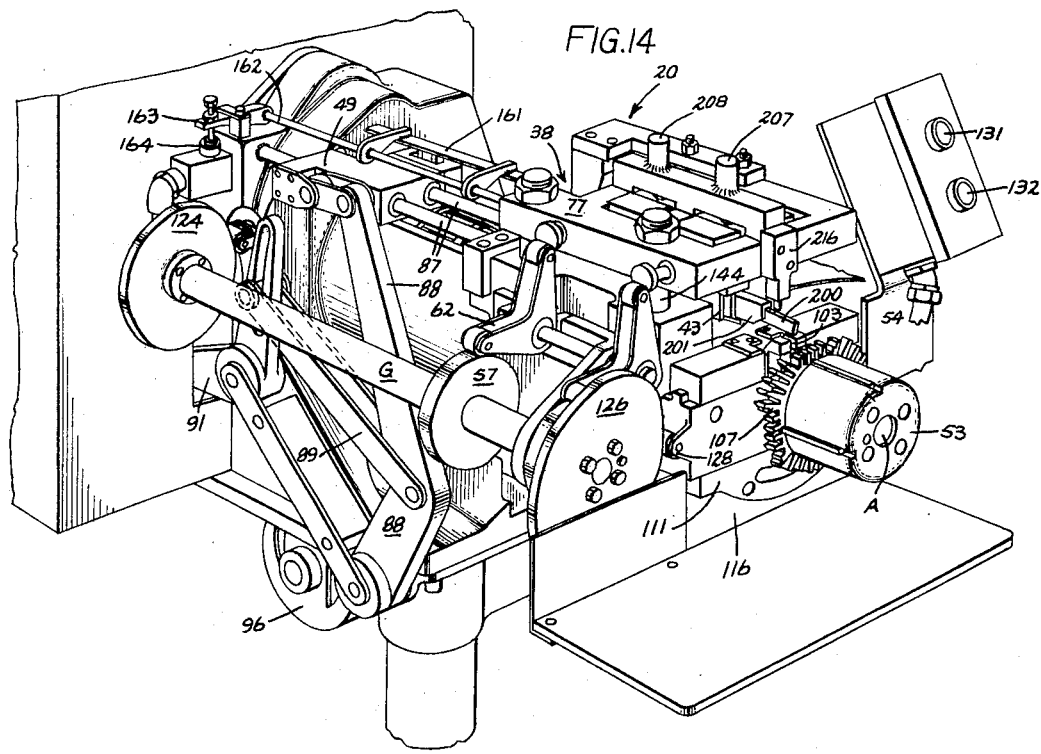
FIG. 14 is a partial front perspective view of apparatus, including the structure of FIG. 1, embodying and adapted to practice the present invention.

With particular reference to FIGS. 14, 17, and 1, a preferred form of apparatus is generally denoted by the reference numeral 20. During operation of the apparatus, a supply of strip material 21 is fed from a not shown storage or supply station by a feeding mechanism. As illustrated, the feeding mechanism includes a folding block 22 that may optionally be used as means for folding one or both edges of the strip material 21 as shown at 23. The feeding mechanism also includes an idler roller 24 that cooperates with driven roller 26 for pressing the folded strip. The roller 26 and driven pinch roller 27 feed the strip material to a strip accumulating station 28.

Power is supplied to the driven rollers 26, 27 through a selectively energizeable electromagnetic clutch 29 from a driven shaft within the apparatus as will be described hereinafter in more detail.

The feeding step includes supplying a predetermined quantity of strip material to a strip accumulating and urging or feeding device at the material feed station 28. The accumulating and feeding device includes an assembly 31 illustrated as including a plurality of leaf springs held together by clamps 32. The number of these leaf springs in the assembly 31 may be selectively varied to vary the stiffness of the assembly. The feeding and accumulating device also includes a signal arm 34 disposed for travel in a slot 36 formed in a guide plate 37. As strip material is urged into the sizing and forming station 38 (best shown in FIG. 1), the signal arm 34 causes a sensing means to be energized subsequent to engagement of the clutch 29. As strip material is then accumulated, the signal arm backs up in the slot 36, is sensed, and the clutch 29 is deenergized. Additional description of the assembly 31, among other things, is set forth in more detail in Leo M. Schlaudroff application Ser. No. 144,425 filed on the same day as this application.

Although the sensing means may include a photocell or mechanical limit switch arrangement, it has been illustrated as including a conventional proximity sensor 39, as in the referenced Schlaudroff application. This sensor is activated only while the metal flag 41 on the end of pivot arm 42 is held adjacent thereto, against the action of tension spring 43, by the signal arm 34.

Figure 13:
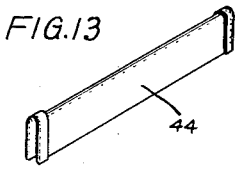
FIG. 13 is a view of a formed strip of material that may be formed by the apparatus of FIG. 1 and placed in a slot of the core shown in FIG. 9.

A portion of the preselected quantity of strip material 21 is urged towards a preselectively movable stop plate 43 (best seen in FIG. 1) and, as taught in the related Mason application, the strip material tends to cock or rotate the leaf spring assembly away from the stop plate 43. Strip pieces such as, for example, the piece 44 shown in FIG. 13, are then formed as a cutting blade carried in cutting head 46 severs the strip material, and a forming mechanism 47 forms the severed strip piece against a forming and insertion blade or tool 48.

After a strip piece has been formed against the forming and insertion tool 48, the tool is moved axially of the apparatus by a blade driver 49 having a lug 51 engaged in a drive slot 52 formed in the tool. Successively formed individual strip pieces are then transferred into or placed in preselected slots of a core disposed on a core support, e.g., core support 53, by successive ones of the forming and placing tools.

As the forming tool 48 moves a formed strip piece or slot liner into a preselected slot of a core, the strip piece is retained on the tool by a pressure finger 200 pivotally supported in a pressure bar 201. The pressure block in turn is vertically slidable relative to side plates as will be set forth in more detail hereinafter.

In the formation of a slot liner, the accumulating and feeding device urges a preselected length of strip material 21 into engagement with the stop plate 43 in the apparatus 20. This preselected length is determined by the accurate positioning of the stop plate 43. The preselected length of material actually severed is, however, determined by the relative positions of the plate 43 and severing blade in the cutting head 46. These relative positions are controlled by the plate cams 56, 57, cam follower linkages 61, 62 supported on a shaft 63, and plungers 64, 66. These plungers are connected to a pair of adjusting yokes or blocks 67, 68 that, respectively, carry the stop plate 43 and severing blade head 46. Springs acting upon the plungers or blocks force the follower linkages 61, 62 to remain in driven engagement with the cams 56, 57. The pressure mechanism 47, as best shown in FIG. 18, includes a spring biased pressure bar 201 supported between two plates 83, 84 and biased downwardly relative thereto by pins 202, 203 under the action of springs 204, 206. With this arrangement, the pressure bar urges strip material against a forming blade or tool positioned adjacent thereto and is useful to hold the material against the tool both while forming an insulator and while inserting the insulator in the slot of a core. The insulator is then formed as it is moved under the pressure finger 200. The coil springs 204, 206 are compressed against the spring retainer sockets 207, 208 (See FIGS. 16 and 1) and the plungers 204, 206 slidably move through the block 209. The pins 211 in bar 201 ride in slots 212 and limit the downward movement of the bar 201. Another spring biased plunger 214, carried in block 216 biases finger 200 downwardly about a pivot pin 217 that, after assembly, holds the finger 200 in the bar 201.

The inserting mechanism 49 (best shown in FIGS. 14, 16 and 17) includes a carriage 86 movable between front and rear positions on guides 87. The carriage is intermittently driven by means of a linkage 88 driven through links 89 and 91 by a crank arm and linkage 92 on shaft F. This shaft is driven through follower 93 by a face cam 94 or pair of conjugate cams connected to a master or drive shaft D which is continuously driven by a drive motor 96 acting through an output shaft K, worm gear 97, and spur gear 98.

The carriage 86 includes a connecting block or leg 51 engaged in a slot of a forming tool such as slot 52 in tool 48. When the carriage 86 is moved forward, it will drive the forming tool 48 forward along a datum plane of the apparatus 20 into a preselected slot of a magnetic core carried by the core support 53 which is provided with suitable frictional retaining means for retaining a slotted core thereon.

As the carriage 86 moves from its rear position to its forward position in response to actuation by the master control shaft D, a slot liner, formed from the piece of electrically insulating strip material 21, will be carried into a core slot aligned with the apparatus datum plane. During this time, the pressure finger retains the slot liner on the forming blade. Thus, it will be understood that shaped liners may be inserted directly into a preselected slot of a magnetic core, after the slot has been aligned with the apparatus datum plane (and therefore a forming tool), so as to reduce the possibility of a slot liner being improperly positioned in a core slot due to a twisting action or the like.

From the foregoing brief description of one preferred form of apparatus, taken in conjunction with the drawings, it will be appreciated that the operating stations of the apparatus 20 are each controlled through the master control or drive shaft D, and that each therefore operate in synchronism for developing slot liners in the axially extending slots of a magnetic device such as a stator core.

While the mechanisms at each of these stations have been fully described above, a further explanation of the synchronizing function or operation of the master control shaft D as well as of the mechanisms at each station is presented below. For ease of understanding, the foregoing description in many respects parallels the description presented in the referenced Mason patent. This parallel description has been provided primarily to promote clarity of description and usage of terminology as consistent as possible with the Mason patent.

With particular reference now to FIGS. 1, 9, 16, and 17, the step-by-step procedures of aligning nonradial slots in the core 100 with a datum plane of the apparatus 20 and with a preselected forming blade aligned with such plane will now be described in more detail.

The stator core 100 includes 36 slots. It will be appreciated that the corresponding slots in each quadrant of the core are substantially identical to each other. Thus, the core may be described as being provided with a group of similar slots in each quadrant with each group comprising nine different slots. For ease of description, only the nine slots in one quadrant of the core 100 have been identified as slots S1 through S9 in FIG. 9, but it will be appreciated that the following discussion and description would pertain to a discussion of the other slots as well. Furthermore, it will be understood that the core 100 has been selected for illustration for purposes of exemplification and discussion only, and that the apparatus 20 has been selected for the same reasons. Thus, the invention exemplified throughout this application may be utilized in connection with slotted cores having more or less than 36 slots. Furthermore, the slotted core may have substantially only one slot configuration throughout, a slot configuration where every slot is different, or repeating series of slots.

Assume first that the core 100 is to be merely indexed angularly in equal increments of 10 degrees by the apparatus 20 about an axis extending along the center $C_S$ of the bore. Also assume the initial index will occur after an insulator has been placed in slot S2. In this case, either slot S1 or S3 would be moved toward the apparatus datum plane. However, these slots would then be so skewed relative to the datum plane of the apparatus that an inserting tool would impinge on the face of the core and not be able to place a strip of material therein.

This condition will be better understood by again referring to FIGS. 1 and 17 and noting that the tool supporting tube 101 is intermittently rotated about a fixed axis during operation of the apparatus 20. During each dwell of the tooling tube 101, while an insulator is being formed and placed, one of the tools, generically identified by the numeral 102, will be positioned in alignment with the tool guide channel 103 and the apparatus datum plane which (by definition for purposes of this discussion) is a vertical plane through the apparatus 20 in which the rotational axis of tube 101 is disposed.

Figure 10:
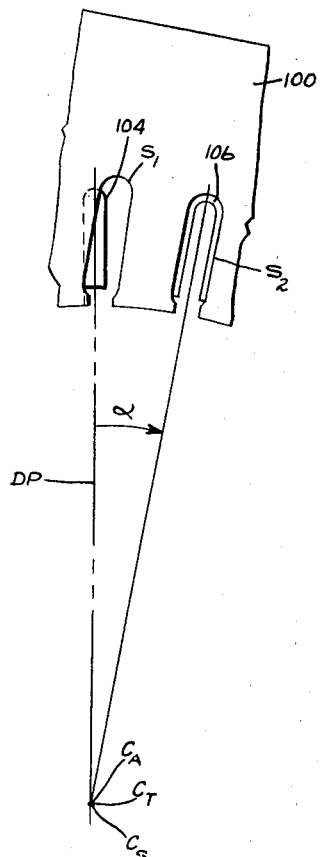
FIGS. 10, 11 and 12 are enlarged views of a portion of the core shown in FIG. 9 and an inserting tool as they would appear in FIGS. 5, 6, and 8, respectively.

FIG. 10 illustrates the interference between the face of core 100 and a blade 104 that would result if the core (after having a slot liner 106 placed in slot S2) were rotated 10 degrees about the center $C_T$ of the tube 101 in the direction of angle $\alpha$ and the blade 104 were indexed into alignment with the apparatus datum plane represented by the broken line DP. However, by the practice of the present invention, this interference is avoided, and the blade 104 and slot S1 will be aligned, both with each other and the datum plane DP.

Figure 11:
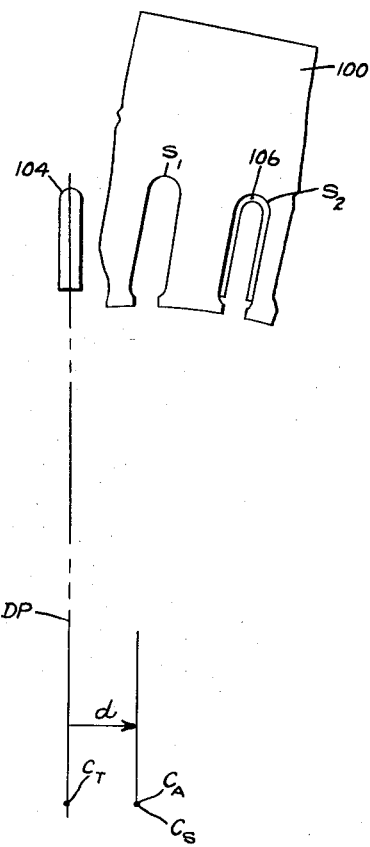
Figure 12:
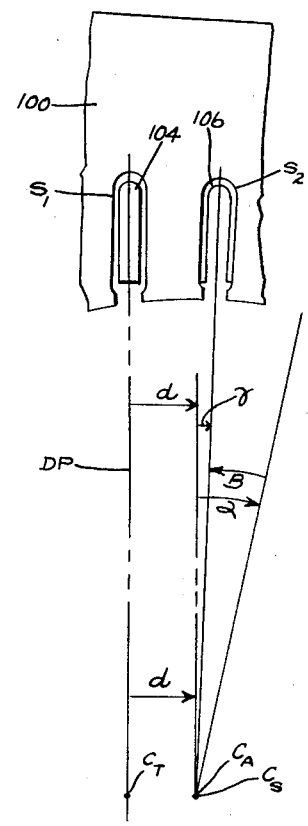

Although specific means by which this desirable result is accomplished will be described in detail hereinafter, the steps by which the result is accomplished will first be generally set forth. Starting from an assumed initial position wherein slot S2 and the blade for insertion of slot liner 106 are aligned with the datum plane, these steps include: angularly index or move the tooling tube 101 through a fixed increment of travel (for example, rotate the tube 101 about axis $C_T$ an angular increment of 40°, this being determined by: 360°/9 blades = 40°/blade); angularly index or move the core a total compensating differential increment of travel, preselected for each particular slot (for example, rotate the core 100 about axis $C_S$ through a compensating differential angular increment through angle $\beta$ as shown in FIG. 12); and compensating for the misalignment of the slot S1 relative to the datum plane. The compensating step may be accomplished as indicated in FIGS. 11 and 12, by translating (e.g., shifting) the axis or center $C_S$ relative to the datum plane a distance d preselected for each slot.

As will now be appreciated, these steps may be practiced sequentially or substantially simultaneously. Whether practiced sequentially or within the same time interval, the indexing of the core through the resultant differential angle $\gamma$ may be accomplished (in the index from slot S2 to S1) by simply rotating the core through the angle $\gamma$ as represented in FIG. 12; or first rotating the core 100 through a fixed angular increment $\alpha$ equal to 10 degrees (for the core 100), and then rotating the core through a preselected differential angle $\beta$ (as shown in FIG. 12) so that the resultant differential angular displacement of core 100 will be equal to the preselected angle $\gamma$.

In the preferred embodiment illustrated herein, the tooling tube index, core index, and core shift are all accomplished during the same time interval. Furthermore, means are provided that substantially simultaneously shift the core axis or center $C_S$ the preselected distance d and tend to rotate the core about the axis $C_S$ through the angle $\beta$ (preselected for each index) while other means tend to rotate the core about the axis $C_S$ through a constant angle $\alpha$ so that the core is actually rotated through the differential angle $\gamma$ which is the vector sum of the angles $\beta$ and $\alpha$.

The exemplified means by which this is accomplished will now be described in detail in connection with FIGS. 1–8 and 17. For this purpose, reference is now made (see FIG. 1) to the core supporting mandrel 53 and a core face protecting guide ring or spider 107 which are secured for rotational indexing movement to the mandrel shaft A. The shaft A is supported at one end by the compensating block bearing 109 and at the other end, adjacent gear 108, by a bearing in the rocker arm 112. The rocker arm 112 is bearing supported for rotation about the axis of a drive shaft M. Thus, the gear end of shaft A may rotate about the axis $C_A$ of shaft A and also rock about the shaft M. The mandrel end of shaft A, however, may rotate in bearing 109 and also shift in a direction perpendicular to the datum plane when the compensating block 111 is shifted on ways 113, 114 in the guide block 116. The two coil springs 58, 59 are compressed against frame block 73 and force the block 111 and linkage 128 to follow cam 126. Similarly, frame element 71 and coil spring 76 force linkage 127 to follow cam 124.

Programmed rotation of the shaft A (and, accordingly, the mandrel, spider, and core when supported on the mandrel) is accomplished by the pinion 117 secured to shaft M. During one index, the pinion 117 tends to drive gear 108 through 10° of rotation and during this same time period, the tooling support tube 101 is indexed through 40° of rotation by means of gear 118 affixed thereto which in turn is driven by gear 119.

With reference to FIG. 17, as the gear 108 is driven by the shaft M, a timing belt 121, driven by sheave 122 on shaft B, rotates sheave 123 and thus cam drive shaft G. Shaft G then drives plate cams 56, 57 and plate cams 124, 126. The cams 124, 126 through cam follower linkages 127, 128, rock the rocker arm 112 and shift the compensating block 111 preselected amounts as determined by the contours of the cams 124, 126. The cams 124, 126 each are provided with nine dwell regions, so that as each of the nine different slots in a quadrant of the core 100 are indexed toward alignment with the datum plane, the cams shift from one dwell region to another and preselectively shift the block 111 and rock the arm 112. This, of course, results in the shaft A being displaced within the hollow tube 101. During each index of the cams 124, 126, the shaft G rotates 40°.

Although it would be necessary, in some applications, to provide different cam contours for cams 124, 126, I have found that for the application of which core 100 is representative, it is possible to provide the cams 124, 126 with substantially identical camming surfaces.

As previously mentioned, the pinion 117 tends to drive gear 108 (and thus shaft A) through 10° during an index period. However, the rocking movement of the gear end of shaft A causes the gear 108 to tend to rotate around the pinion 117. The degree of this rotation of gear 108 relative to pinion 117 corresponds to the angle $\beta$ in the preceding discussion of FIGS. 10–12, and the angle $\beta$ is either additive or subtractive relative to the angle $\alpha$, depending on the direction of movement of the linkage 127 as it is moved from one dwell position to another of cam 124.

In order for the angle $\beta$ to be subtractive from the angle $\alpha$, (assuming clockwise rotation of shaft A, looking into FIG. 17), the linkage 127 will be moving in the direction of the arrow 129. On the other hand, when linkage 127 is moved in a direction opposite of that indicated by arrow 129, the angle $\beta$ will be additive to the angle $\alpha$. In either case, the vector sum of angles $\alpha$ and $\beta$ will be the differential or resultant angle $\gamma$, through which the mandrel end of shaft A will be actually rotated.

It will now be understood that the mandrel end of the shaft A, supported by the bearing 109 and compensating block 111 will both rotate through the differential angle $\gamma$ and be translated a distance d (see FIG. 12) by the action of cam 126. In addition, this all occurs while the tube 101, carrying the tool blades 102 is rotated 40° about the center line of tube 101 which remains fixed in the datum plane of apparatus 20.

FIGS. 2 through 8 graphically represent the compensating operation of the apparatus 20. For purposes of description, these figures have been made to more closely correspond to an operational sequence as illustrated by FIGS. 10–12 rather than to the preferred operation of apparatus 20 as just described.

Thus, FIGS. 2 through 8 have been drawn to illustrate the relative positions of the rocker arm 112, pinion 117, and gear 108; as well as a segment of the core 100 and centers $C_A$, $C_T$, $C_S$ during the index period while slot S2 of the core is being indexed away from the datum plane DP and slot S1 is being indexed into alignment with the datum plane.

Figure 2:
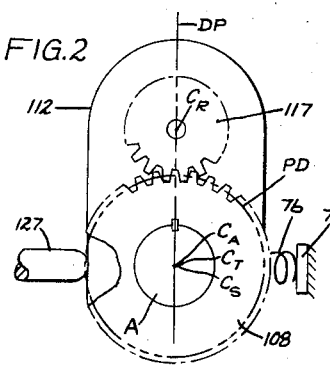
FIGS. 2 through 8 are schematic representations of selected portions of the apparatus shown in FIG. 1 and portions of a slotted core; and are presented to illustrate the compensated alignment of a selected core slot with an apparatus datum plane and, more specifically.
Figure 3:
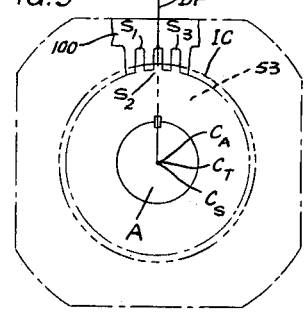

Looking first at FIGS. 2 and 3, the centers or center lines $C_A$, $C_T$, and $C_S$, of the mandrel shaft A, tooling tube 101, and stator core 100, are all generally coincident and lie in the datum plane DP during the time that the slot S2 is being provided with a strip of insulating material. Then, after the insertion tool used for inserting the strip material into slot S2 has returned to its dwell or home position, the apparatus 20 undergoes a mandrel index cycle and the tooling tube 101 is indexed so that the next successive tooling blade to be used in connection with the formation and insertion of a strip of insulating material in the nonradially disposed slot S1 is brought into alignment with the datum plane DP. During this same time period, the mandrel 53 is rotated and shifted to bring the slot S1 into generally symmetrical alignment with the datum plane DP and thus into accurate alignment with the tooling blade to be used therewith. Thereupon, the tooling tube 101, mandrel shaft A, mandrel 53, stator 100, and rocker arm 112 dwell as a strip of insulating material is fed and advanced into the head of the apparatus 20, and cut to a preselected length as the cutting blade is pulled downwardly by the pull rods as set forth in the referenced Mason U.S. Pat. No. 3,514,836.

Figure 4:
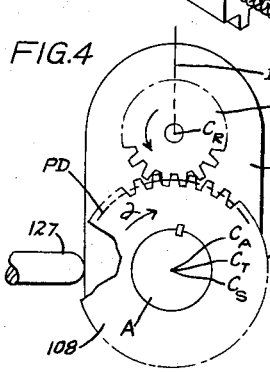
Figure 7:
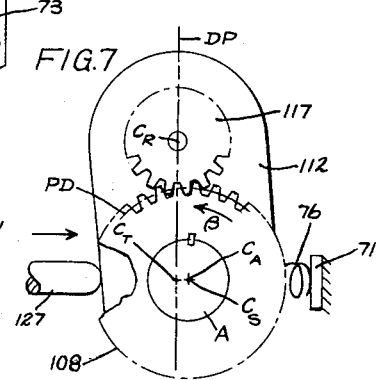
Figure 5:
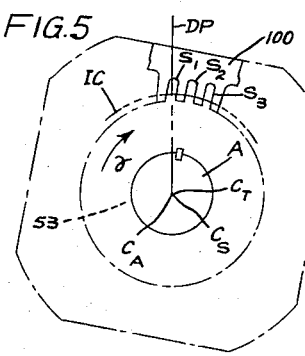
Figures 6, 8:
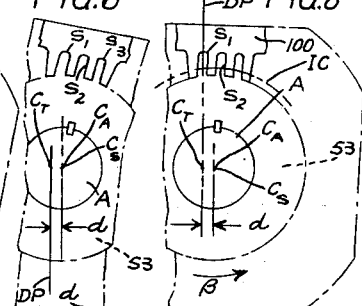

After a slot liner is inserted into slot S2, the pinion 117 drives (or tends to drive) the mandrel 53 and gear 108 through the angle $\alpha$ as shown in FIGS. 4 and 5. At this same time, the linkage 127 rocks the rocker arm 112 and compensating block 111 (due to linkage 128) moves the mandrel 53 a compensating distance d as shown in FIG. 6. However, the movement of rocker arm 112 about the axis $C_R$ of shaft M moves the gear 108 relative to pinion 117 so that gear 108 tends to rotate through the angle $\beta$. The final position of these parts is shown in FIGS. 7 and 8 wherein the slot S1 is aligned with the datum plane DP, and the core 100 has been translated a distance d and rotated through the differential angle $\gamma$.

Having the foregoing in mind, it will now be appreciated that the apparatus 20 is provided with a drive train which accomplishes at appropriate times during a complete machine cycle (a complete machine cycle being one in which all of the slots of a given stator core have been provided with insulation as determined by the operator of the apparatus) a desired compensated indexing of a core having nonradial slots formed therein.

Now having reference to FIGS. 1, 4, and 14–16, it will be understood that one complete operational sequence of the apparatus 20 will be accomplished when an operator places a core on mandrel 53 and pushes the start button 131.

When button 131 is actuated, control means (as described, for example, in the Mason U.S. Pat. No. 3,514,836) will cause the apparatus 20 to operate continually until a stator core has been provided with the desired number of strips of insulative material. The relative positioning of some of the shafts and gears which make up part of the drive train for the apparatus 20 are clearly revealed in FIG. 15, but a complete operational cycle of apparatus 20 will be best appreciated by referring again to FIG. 17.

As previously stated, power is supplied to the apparatus 20 from the motor 96 through shaft K to the worm 97 which drives worm gear 98 keyed to main drive shaft D. Also keyed to shaft D is a flag 133 to be utilized in connection with the proximity sensor 134 as will be described in more detail hereinafter.

A Geneva cam roller 136 and locking cam 137 on shaft D intermesh with a Geneva cam 138 secured to shaft C so that shaft C will rotate 90 degrees for every 360 degrees rotation of shaft D. During the time that the Geneva cam roller 136 is interfitted with a follower slot on the Geneva cam 138, the cam 138 is driven and accordingly shaft C will rotate. However, as the cam roller 136 emerges from a cam follower slot, the locking portion 137 of the Geneva driver will mesh with the locking surfaces 139 on the Geneva cam and prevent any additional rotation of the shaft C until such time as the Geneva cam roller 136 reengages a cam follower slot on the cam 138. Also keyed to shaft D are a pair of cams 94 and 139. Although in actual practice, these cams are preferably conjugate cams, they have been schematically illustrated as simple cams.

The cam 94, as previously explained, imparts motion to the linkage 91, 89, 88 so that during each revolution of the shaft D one of the insertion tools on tube 101 is advanced and retracted.

The cam 139, during each revolution of the shaft D, oscillates shaft E through the action of follower 141. The pinion 142, secured to shaft E, moves rack 143 downwardly from a dwell position; and through pull rods 144, 146, the rack 143 actuates the severing and forming means carried by the head 38 which were described in more detail in the discussion of FIGS. 1 and 16. After being driven downwardly, the rack 144 is returned vertically upwardly and dwells during the remainder of a revolution of shaft D, as will be understood.

As the shaft C is rotated, it supplies power to clutch 29 and also drives shaft B by the engagement of gear 147 with gear 148 on shaft B. For each 90° revolution of shaft C, shaft B turns through an angle of 60°. Gears 119 and 149 on shaft B then respectively drive the gears 118 and 151 so that the shaft M is rotated through an angle of 20° while the tooling tube (connected to the gear 118) is rotated through an angle of 40°. The shaft B, through timing belt pulley 122, drives the timing belt pulley 123 and cam shaft G through an angle of 40°, whereas the pinion gear 117 secured to the shaft M tends to drive the mandrel shaft A through approximately 10° of rotation as previously explained.

The cams 124 and 126 are, as noted, substantially identical and each provided with nine dwell portions. During operation of the machine, the followers 127 and 128 are driven from one dwell position to another during a mandrel index cycle. The cams 56 and 57 are also provided with nine dwell regions and through the cam follower linkages 61, 62 respectively operate the plungers 64, 66 in order to adjust the stop plate and severing means as previously described. Not shown compression coil springs, carried in plate 77, urge the plungers against the linkages 61, 62 and cause these linkages to follow cams 56, 57 as will be understood.

Figure 9:
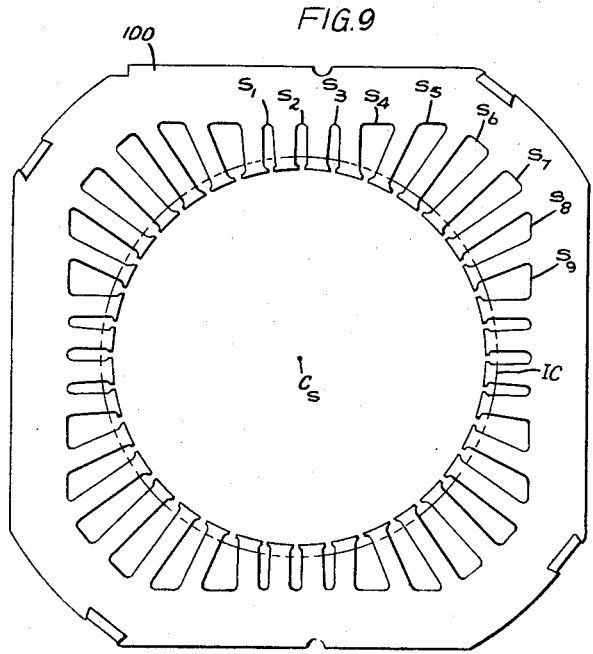
FIG. 9 is an enlarged view of the magnetic core that is partially shown in FIG. 3.

Comparing now FIG. 17 with the configuration of the stator shown in FIG. 9, it will be understood that the mandrel 53 is both secured to shaft A and particularly adapted to support the core 100. Furthermore, since the center $C_A$ of the mandrel will be in the datum plane DP while the slots S2 in each quadrant of the core 100 are aligned with the datum plane, and the slots S2 in each successive core quadrant are spaced 90° apart, the mandrel and core will undergo 90° of rotation while the nine blade supporting tooling tube 101 and cam shaft 6 will move through one complete revolution. Of course, during each index of mandrel movement within the total 90° mandrel displacement just referred to, the mandrel will rotate through 10° plus or minus a predetermined angle that is preselected to bring the next successive core slot into alignment with the datum plane.

Then, after one complete revolution of mandrel shaft A at the end of which time the compensating block 111 will have returned the mandrel center line to the datum plane, the shaft A will have turned 360°, the cam shaft G will have rotated through 1,440°, and the apparatus will have completed one machine cycle and stop so that an insulated core may be removed from the mandrel 53 and another core placed on the mandrel in preparation for the operation of another machine cycle.

The apparatus 20 is automatically stopped or declutched by means of sensing means that are illustrated as including the pair of series connected proximity sensors 134, 152. The proximity sensor 152 senses a flag 153 carried on a timing chain 154 driven through a sprocket 156 carried on an extension of the cam shaft G. On the other hand, proximity sensor 134 is energized by the flag 133 carried on the disc 157 which is secured to an extension of the main drive shaft D. It will be understood that even though the proximity sensor 21 is energized once during each revolution of the main drive shaft D, the apparatus 20 will not be declutched by a not shown clutch on shaft K until such time as the sensors 134 and 152 substantially simultaneously sense the presence of the flags 133, 153, respectively. The advantages of this arrangement are described in more detail in the above identified Schlaudroff application Ser. No. 144,425. Then, when the clutch on shaft K is disengaged (either on signal from the sensors 134, 152 or upon depression of stop button 132 shown in FIG. 14), a magnetic brake may be utilized to substantially instantaneously stop the drive shafts K and D.

Further details of the tooling blade driving block 49 will now be presented with reference being made to FIGS. 14, 16, and 17. In these figures, the same reference numerals refer to identical parts although some of the parts are illustrated realistically in one FIGURE and schematically in another FIGURE. As the driving block 49 advances along the guides 87, an inserting blade 102 will be advanced toward the spider 107 and core supported by a mandrel on shaft A. In the event that the inserting blade encounters an obstruction in a core slot or in the event that the spider or supported core is not properly aligned with the datum plane, the apparatus 20 will be deenergized and stop. This function is provided by the movement of driving pin 158 (affixed to driving arm 51) rearwardly and upwardly relative to the slot 159. The upward movement of pin 158 disengages the arm 51 from a drive slot 52 in a tooling blade and also causes the arm 51 to engage the stop bar 161 carried by shaft 162. This then causes shaft 162 to rotate slightly and, through arm 163, touch and open emergency stop switch 164.

Figure 15:
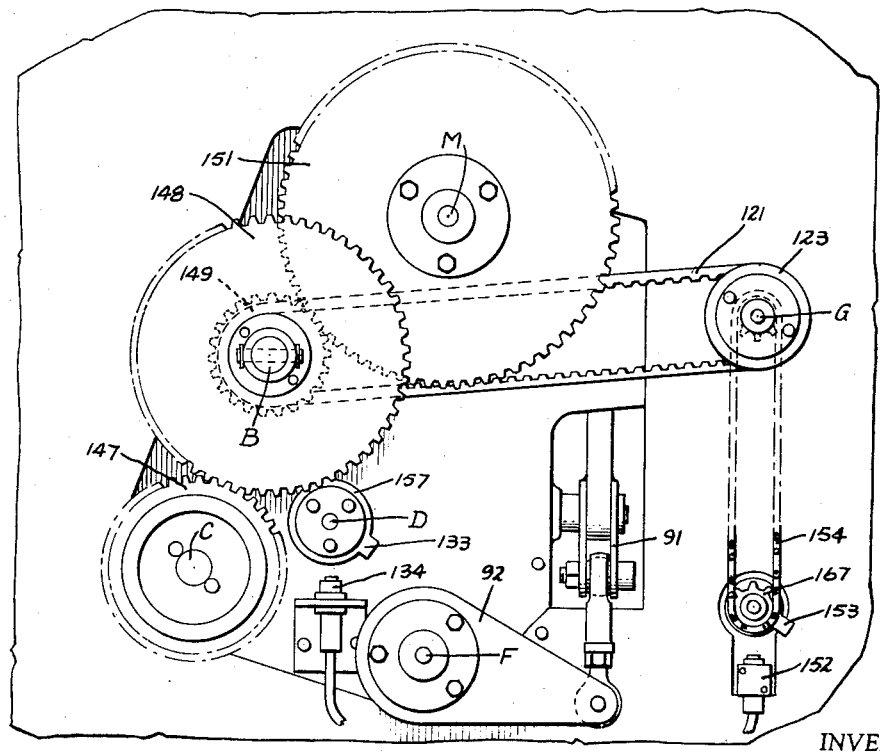
FIG. 15 is a rear view, with parts removed, of the apparatus shown in FIG. 14.

Turning now to FIG. 15, there is revealed a rear view of the apparatus 20. From this view, the location and relationships of various ones of the shafts F, C, D, B, M, G, and related parts will be understood. In addition, the positions of the proximity detectors 134, 152, and return sprocket 167 for chain 154 are clearly illustrated.

In view of the foregoing, it will be appreciated that the emergency stop mechanism, stop plate 43, forming tools 102 and drive therefor, and severing mechanism 46 are quite similar, if not identical, to those corresponding parts described in the referenced Mason patent. Thus, the advantages of the Mason apparatus and method are also attainable while utilizing the present invention.

Referring now once again to FIGS. 2–9, it will be noted that the pitch line or diameter PD of gear 108 has been shown with a broken line. Also shown by a broken line IC on the core 100 (in FIGS. 3 and 9) is a circle passing through the teeth of the core just beyond the restricted slot entrances 225 which are defined by the tips 226 of the core teeth. I have determined that it is preferable for the pitch diameter PD of gear 108 to be selected to be approximately equal to the diameter of the circle IC. However, the diameter of the circle IC is relatively arbitrarily selected and is no more precisely defined than to say that it lies relatively close to, but beyond the restricted entrances. Thus, it should be appreciated that satisfactory operation will result when, for a given core, a commercially available gear 108 is selected having a pitch diameter approximately equal to, or slightly larger than the bore of the given core. When this is done, it will be appreciated that the arcuate distance along the pitch circle PD for a given subtended angle will be approximately the same as the arcuate distance along the circle IC for the same subtended angle.

Therefore, the preselection of the differential angle $\gamma$ for each index of the core may be equated with the angle $\gamma$ through which the gear 108 is to be rotated. This in turn may be readily accomplished by appropriate design of the cams 124, 126 as will be understood. In an actual embodiment of the apparatus 20, angle $\gamma$ was about 10°, and the angle $\alpha$ varied from about seven to about 13°, depending on which one of the slots S1-S9 was being moved into registry with the apparatus datum plane.

In view of the above, it should be understood that the apparatus embodying the invention could be utilized for placing other insulators including phase insulators and slot closure insulators as well as slot liners in inductive devices other than stator cores. Also, insulator fabricating means other than those illustrated may be used. Furthermore, the illustrated compensating means, including the driven mechanical linkages may be modified such that the generally rectilinear movement of the mandrel end of shaft A would be at least slightly curvilinear; e.g., move in an arc like the gear end of shaft A. In this latter case, the axis of the mandrel shaft would still be generally parallel to the datum plane.

It will now be understood (my invention having been completely described in connection with a preferred form of equipment) that apparatus embodying and utilized in the practice of the present invention may be quickly set up to handle different stator cores within a very short period of time. For example, in the apparatus 20, the forming and inserting tools 102 may be readily interchanged with forming and inserting tools of other configurations; and most, if not all, of the gears that would be changed in order to control the relative amounts and direction of rotation of the shafting are readily accessible at the rear of the apparatus.

Therefore, while in accordance with the Patent Statutes, I have described what at present are considered to be the preferred forms of the invention it will be obvious to those skilled in the art that numerous changes and modifications may be made therein without departing from the true spirit and scope of the invention, and it is therefore aimed in the following claims to cover all such modifications.

What I claim as new and desire to secure by Letters Patent of the United States is:

1. Apparatus for placing material in at least one preselected nonradially disposed slot of a magnetic core for use in an inductive device, the apparatus comprising: position determining control means for disposing the at least one nonradially disposed slot of the core in alignment with a selected apparatus datum plane, said position determining control means including a locating device for angularly moving the core about an axis and for shifting the core axis from one position to another relative to the selected apparatus datum plane to effect alignment of the at least one nonradially disposed slot with the selected apparatus datum plane; and material placing means for effecting placement of material in the at least one preselected nonradially disposed slot of the core when the at least one preselected nonradially disposed slot is in alignment with the selected apparatus datum plane.

2. The apparatus of claim 1 wherein: the locating device comprises a shaft having a mandrel supported at one end thereof; and the apparatus further comprises a first bearing supported for movement toward and away from the datum plane, the first bearing rotatably supporting the shaft adjacent the one end thereof; and a second bearing supported for movement relative to the datum plane, the second bearing rotatably supporting the shaft adjacent the other end thereof.

3. The apparatus of claim 1 wherein the control means includes at least one cam movable through a fixed angular increment of travel while the locating device is angularly moving the core about an axis and shifting the core axis from one position to another.

4. Apparatus for placing material in at least one preselected nonradially disposed slot of a magnetic core, the apparatus comprising: material placing means for effecting placement of material in at least one preselected nonradially disposed slot of the core at a first reference location; mandrel means for angularly moving the core about an axis; and compensating means for effecting a relative shift between the core axis and placing means to attain alignment of the at least one nonradially disposed slot of the core and the placing means with the reference location.

5. The apparatus of claim 4 further comprising bearing means for supporting the mandrel means for angular movement; and wherein the compensating means includes a driven mechanical linkage interconnected with the bearing means to thereby selectively shift the bearing means relative to the reference location.

6. The apparatus of claim 4 further comprising a frame; and wherein the placing means is supported for selective movement relative to the frame while the relative shift between the core axis and placing means is being effected.

7. A method of providing insulation in preselected, nonradially disposed slots of a magnetic core, the method comprising the steps of: supporting the magnetic core on a holder having a central axis located in one position; moving a predetermined insulation applying tool through a fixed increment of travel to an operating position where insulation is supplied thereto; aligning one of the preselected slots in the core with the predetermined insulation applying tool by angularly displacing the holder having the core thereon through a preselected differential angle about the central axis thereof and shifting the central axis a predetermined distance to another position, displaced from the one position, to establish the desired alignment; and depositing insulation in the preselected slot by moving the predetermined insulation applying tool having insulation therewith from the operating position toward the preselected slot to effect deposition of the insulation in the preselected slot.

8. The method of claim 7 further including moving a second predetermined insulation applying tool through the fixed increment of travel to the operating position where insulation is supplied thereto; aligning another preselected slot in the core with the second predetermined insulation applying tool by angularly displacing the holder having the core thereon through another preselected differential angle about the central axis thereof and shifting the central axis another preselected distance to a third position, displaced from the another position, to establish the desired alignment; and depositing insulation in the another preselected slot by moving the second predetermined insulation applying tool having insulation therewith from the operating position toward the another preselected slot to effect deposition of the insulation in the another preselected slot.

9. A method of placing insulation in the slots of a magnetic core having at least some nonradially disposed slots, the method comprising the steps of: disposing the core having an axis in one position with a first core slot aligned with a reference location; displacing the core axis from the one position to another position displaced from the one position and angularly displacing the core to align a nonradially disposed, second slot in the core with the reference location; and placing insulation in the nonradially disposed slot at the reference location.

10. The method of claim 9 further comprising the steps of feeding a quantity of insulation to the reference location after the nonradially disposed slot in the core is aligned therewith; and wherein placing insulation in the nonradially disposed slot comprising moving the quantity of insulation into the nonradially disposed slot in the core.

11. The method of claim 9 further comprising placing insulation in the first core slot at the reference location while the first core slot is aligned with the first location.

12. The method of claim 9 further comprising aligning an insulation applying tool with the reference location as the nonradially disposed slot is aligned with the reference location, and placing a quantity of insulation on the tool; and wherein the step of placing insulation in the nonradially disposed slot at the reference location comprises advancing the insulation applying tool and quantity of insulation toward the nonradially disposed slot.

13. Apparatus for placing insulation in the slots of a magnetic core having at least some nonradially disposed slots, the apparatus comprising: first means for supporting a core in one position with a first slot aligned with a reference location; second means for displacing the first means and core axis to another position displaced from the one position and for angularly displacing the core to align a nonradially disposed, second slot in the core with the reference location; and third means for placing insulation in the nonradially disposed slot at the reference location.

14. The apparatus of claim 13 wherein the first means includes a core support and the second means includes a shaft connected to the mandrel and supported for angular and substantially linear movement of at least one end thereof.

15. The apparatus of claim 14 wherein the third means includes an insulation insertion tool supported for movement toward and away from the reference location.

* * * * *